(12) United States Patent
Drucker et al.

(10) Patent No.: US 12,130,889 B2
(45) Date of Patent: Oct. 29, 2024

(54) NEURAL NETWORK TRAINING WITH HOMOMORPHIC ENCRYPTION

(71) Applicant: INTERNATIONAL BUSINESS MACHINES CORPORATION, Armonk, NY (US)

(72) Inventors: Nir Drucker, Haifa (IL); Ehud Aharoni, Kfar Saba (IL); Hayim Shaul, Kfar Saba (IL); Allon Adir, Kiryat Tivon (IL); Lev Greenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 17/655,566

(22) Filed: Mar. 21, 2022

(65) Prior Publication Data
US 2023/0297649 A1 Sep. 21, 2023

(51) Int. Cl.
*G06F 18/214* (2023.01)
*G06N 3/04* (2023.01)
(Continued)

(52) U.S. Cl.
CPC ............ *G06F 18/2148* (2023.01); *G06N 3/04* (2013.01); *G06N 3/08* (2013.01); *H04L 9/008* (2013.01)

(58) Field of Classification Search
CPC ......... H04L 9/008; H04L 9/0618; G06N 3/08; G06N 3/045; G06N 20/00; G06N 3/04;
(Continued)

(56) References Cited

U.S. PATENT DOCUMENTS

| 11,582,203 B2 * | 2/2023 | Storm | G06Q 20/1235 |
| 2020/0036510 A1 * | 1/2020 | Gomez | H04L 9/008 |

(Continued)

FOREIGN PATENT DOCUMENTS

CN 110610242 A 12/2019

OTHER PUBLICATIONS

Kentaro et al., "Neural Network Training With Homomorphic Encryption" (Year: 2020).*

(Continued)

*Primary Examiner* — Dung Hong
(74) *Attorney, Agent, or Firm* — Stosch Sabo

(57) ABSTRACT

A method, a neural network, and a computer program product are provided that optimize training of neural networks using homomorphic encrypted elements and dropout algorithms for regularization. The method includes receiving, via an input to the neural network, a training dataset containing samples that are encrypted using homomorphic encryption. The method also includes determining a packing formation and selecting a dropout technique during training of the neural network based on the packing technique. The method further includes starting with a first packing formation from the training dataset, inputting the first packing formation in an iterative or recursive manner into the neural network using the selected dropout technique, with a next packing formation from the training dataset acting as an initial input that is applied to the neural network for a next iteration, until a stopping metric is produced by the neural network.

16 Claims, 7 Drawing Sheets

(51) Int. Cl.
  *G06N 3/08*     (2023.01)
  *H04L 9/00*     (2022.01)
(58) Field of Classification Search
  CPC ..... G06N 3/02; G06F 21/602; G06F 21/6245; G06F 2207/4824; G06F 18/2148
  See application file for complete search history.

(56) References Cited

U.S. PATENT DOCUMENTS

| | | | | |
|---|---|---|---|---|
| 2021/0271963 | A1* | 9/2021 | Amisano | G06N 3/08 |
| 2021/0344478 | A1* | 11/2021 | Sarpatwar | G06N 3/08 |
| 2022/0075878 | A1* | 3/2022 | Begg | G06F 21/6245 |

OTHER PUBLICATIONS

Paul et al., "Privacy-Preserving Collective Learning With Homomorphic Encryption", Sep. 2021 (Year: 2021).*

Robert et al., "Sok: Privacy-preserving Deep Learning with Homomorphic Encryption", Jan. 2022 (Year: 2022).*

George et al., "Fully Homomorphically Encrypted Deep Learning as a Service", Oct. 2021 (Year: 2021).*

Ayoub Benaissa, Bilal Retiat, Bogdan Cebere, and Alaa Eddine Belfedhal. TenSEAL: A Library for Encrypted Tensor Operations Using Homomorphic Encryption. arXiv, 2021, https://arxiv.org/abs/2104.03152.

Boemer, F., Costache, A., Cammarota, R., & Wierzynski, C. (2019). NGraph-HE2: A High-Throughput Framework for Neural Network Inference on Encrypted Data. Proceedings of the 7th ACM Workshop on Encrypted Computing Applied Homomorphic Cryptography, 45-56. https://doi.org/10.1145/3338469.3358944.

Cheon J.H., Han K., Kim A., Kim M., Song Y. (2019) A Full RNS Variant of Approximate Homomorphic Encryption. In: Cid C., Jacobson Jr. M. (eds) Selected Areas in Cryptography—SAC 2018. SAC 2018. Lecture Notes in Computer Science, vol. 11349. Springer, Cham. https://doi.org/10.1007/978-3-030-10970-7_16.

Dathathri, R., Saarikivi, O., Chen, H., Laine, K., Lauter, K., Maleki, S., Musuvathi, M., & Mytkowicz, T. (2019). CHET: An Optimizing Compiler for Fully-Homomorphic Neural-Network Inferencing. Proceedings of the 40th ACM SIGPLAN Conference on Programming Language Design and Implementation, 142-156.

Geoffrey E. Hinton, Nitish Srivastava, Alex Krizhevsky, Ilya Sutskever, Ruslan Salakhutdinov, 2012, Improving neural hetworks by preventing co-adaptation of feature detectors, https://arxiv.org/abs/1207.0580v1.

Gilad-Bachrach, R., Dowlin, N., Laine, K., Lauter, K., Naehrig, M. Wernsing, J . . . (2016). CryptoNets: Applying Neural Networks to Encrypted Data with High Throughput and Accuracy. Proceedings of the 33rd International Conference on Machine Learning Proceedings of Machine Learning Research 48:201-210, https://proceedings.mlr.press/v48/gilad-bachrach16.html.

Jin Chao et al, CaRENets: Compact and Resource-Efficient CNN for Homomorphic Inference on Encrypted Medical Images, CoRR, abs/1901.10074, 2019, http://arxiv.org/abs/1901.10074.

Mell et al., "The NIST Definition of Cloud Computing," Recommendations of the National Institute of Standards and Technology, U.S. Department of Commerce, Special Publication 800-145, Sep. 2011, 7 pgs.

Nitish Srivastava and Geoffrey Hinton and Alex Krizhevsky and Ilya Sutskever and Ruslan Salakhutdinov, Dropout: A Simple Way to Prevent Neural Networks from Overfitting, Journal of Machine Learning Research, 2014, v15, n56, pp. 1929-1958, http://jmlr.org/papers/v15/srivastava14a.html.

Roshan Dathathri, Blagovesta Kostova, Olli Saarikivi, Wei Dai, Kim Laine, and Madan Musuvathi. 2020. EVA: an encrypted vector arithmetic language and compiler for efficient homomorphic computation. In Proceedings of the 41st ACM SIGPLAN Conference on Programming Language Design and Implementation (PLDI 2020). Association for Computing Machinery, New York, NY, USA, 546-561. DOI:https://doi.org/10.1145/3385412.3386023.

Sinem Sav et al., POSEIDON: Privacy-Preserving Federated Neural Network Learning, 2021, 2009.00349, https://arxiv.org/abs/2009.00349.

Syed, Dabeeruddin & S. Refaat, Shady & Bouhali, Othmane. (2020). Privacy Preservation of Data-Driven Models in Smart Grids Using Homomorphic Encryption. Information. 11. 357. 10.3390/info11070357. https://www.mdpi.com/2078-2489/11/7/357/htm.

* cited by examiner

NEURAL NETWORK TRAINING WITH HOMOMORPHIC ENCRYPTION

BACKGROUND

The present disclosure relates to neural network training with homomorphic ally encrypted elements, and more specifically, to optimized training of neural networks using homomorphically encrypted elements and dropout algorithms for regularization.

A neural network, or artificial neural network, is a subset of machine learning that contains an input layer, one or more hidden layers, and an output layer. Each node, or artificial neuron, connects to another and has an associated weight and threshold. If the output of any individual node is above a specified threshold value, that node is activated, sending data to the next layer of the network. There are various types of neural networks such as modular neural networks, recurrent neural networks, generative adversarial networks, deep neural networks, spiking neural networks, feedforward neural networks, and physical neural networks.

Homomorphic encryption is a form of encryption that permits users to perform computations on encrypted data without first decrypting it. The resulting computations are left in an encrypted from which, when decrypted, resulting in an identical or similar output to that produced had the operations been performed on the unencrypted data. This allows data to be encrypted and outsourced to other environments, such as commercial cloud environments for processing, while still being encrypted.

SUMMARY

Embodiments of the present disclosure include a method that optimizes the training of neural networks using homomorphic ally encrypted elements with dropout algorithms for regularization. The method includes receiving, via an input to the neural network, a training dataset containing samples that are encrypted using homomorphic encryption and determining a packing formation used by the homomorphic encryption used to pack the samples in the training dataset. The method also includes selecting a dropout technique during training of the neural network based on the packing technique. The method further includes starting with a first packing formation from the training dataset, inputting the first packing formation in an iterative or recursive manner into the neural network using the selected dropout technique, with a next packing formation from the training dataset acting as an initial input that is applied to the neural network for a next iteration, until a stopping metric is produced by the neural network.

Additional embodiments of the present disclosure include a computer program product that optimizes training of neural networks using homomorphically encrypted elements with dropout algorithms for regularization, one or more computer-readable storage medium, and program instructions stored on the one or more computer-readable storage media, the program instruction executable by a processor to cause the processor to receive, via an input to the neural network, a training dataset containing samples that are encrypted using homomorphic encryption and determine a packing formation used by the homomorphic encryption used to pack the samples in the training dataset. The computer program product also includes instructions that cause the processor to select a dropout technique during training of the neural network based on the packing technique. The computer program product also includes instructions that cause the processor to start with a first packing formation from the training dataset, input the first packing formation in an iterative or recursive manner into the neural network using the selected dropout technique, with a next packing formation from the training dataset acting as an initial input that is applied to the neural network for a next iteration, until a stopping metric is produced by the neural network.

Further embodiments of the present disclosure include a neural network that is trained using homomorphically encrypted elements with dropout algorithms for regularization. The neural network can be implemented within a system that includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
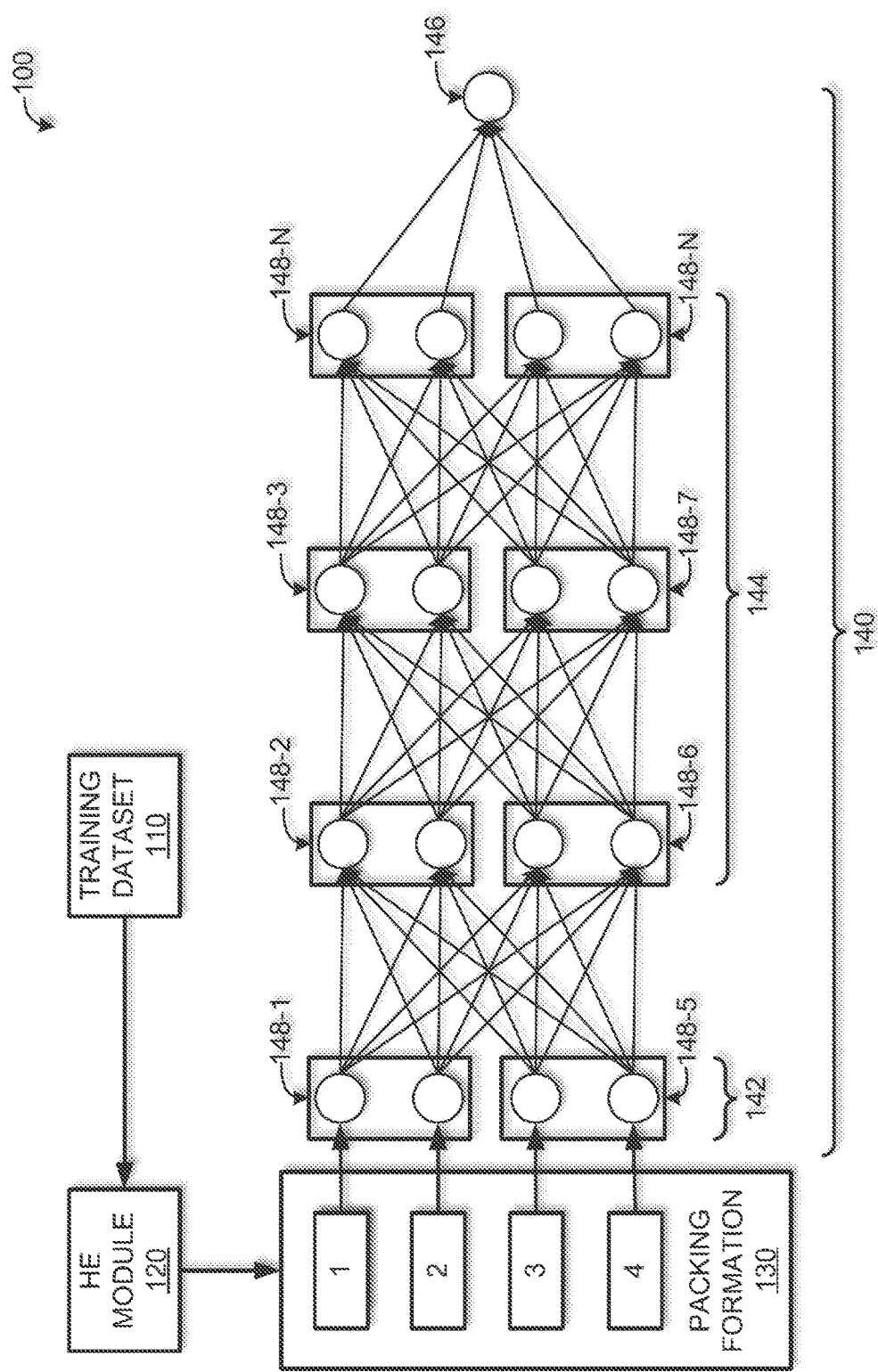
FIG. 1 is a block diagram illustrating an operation of the primary operational elements of training a neural network and used by one or more embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to neural network training with homomorphically encrypted elements, and more specifically, to optimized training of neural networks using homomorphic encrypted elements and dropout algorithms for regularization. While the present disclosure is not necessarily limited to such applications, various aspects of the disclosure may be appreciated through a discussion of various examples using this context.

Homomorphic encryption allows arbitrary computations to occur on encrypted data (ciphertexts) without decryption. Given a public key pk, a secret key sk, an encryption function $\epsilon(\ )$, and a decryption function $\sigma(\ )$, a homomorphic encryption operation $\otimes$ can be defined if there is another operation $\times$ such that $\sigma(\epsilon(x_1,pk) \otimes \epsilon(x_2,pk),sk)=\sigma(\epsilon(x_1 \times x_2, pk),sk)+\epsilon$ where $x_1$ and $x_2$ are plaintexts, each of which encodes a vector consisting of multiple integer or fixed-point numbers. Approximate homomorphic encryption can also be used such that the results are similar and decipherable accounts for a certain amount of noise. It should be noted that each homomorphic encryption operation introduces a certain amount of noise into the ciphertext. When the accumulated noise grows beyond a noise budget, a decryption failure can occur.

Homomorphic encryption can be applied and used as input for neural networks that can be seen as privacy-preserving neural networks. An artificial neural network, or neural network, consists of an input layer of neurons (or nodes, units), multiple hidden layers of neurons, and a final layer of output neurons. The neural network interconnects the neurons that use a mathematical or computational model for information processing. Neural networks include, but are not limited to, modular neural networks, recurrent neural networks, generative adversarial networks, deep neural networks, spiking neural networks, feedforward neural networks, and physical neural networks.

Neural networks can have tens of thousands of parameters, with some networks having parameters in the millions. With so many parameters, neural networks can be flexible and can fit a large variety of complex datasets. However, the downside to this complexity is that neural networks can be prone to overfitting their training sets. There are multiple techniques that can avoid overfitting a training set. For instance, a technique referred to as early stopping can be introduced that interrupts training when a neural network's performance on a validation set begins to decline. Another technique regularization technique is $t_1$ and $t_2$ regularization that constrains a neural network's connection weights. The dropout technique is also a common regularization technique that is used to prevent overfitting.

In dropout, at every training step, every neuron (including the input neurons but excluding the output neurons) has a probability of being temporarily "dropped out," meaning it will be entirely ignored during that training step, but it may be active during the next step.

Encrypting individual values for each input neuron can yield a very large ciphertext, which can be inconvenient from a user perspective and can require a high bandwidth requirement as a direct consequence. In order to mitigate this issue, multiple values can be "packed" into one ciphertext. With multiple elements packed into a single ciphertext, a ciphertext mask can be used to perform operations on specific elements within that ciphertext. For example, a ciphertext with three elements can have a masked applied such that only the third element is used.

Limitations on utilizing homomorphic encryption input on a neural network remain, however, as training these models is computationally intensive with dropout and masking increases the multiplication depth of these neural networks. Multiplication depth, as referred herein, refers to the longest number of sequential multiplication operations that can be performed before a bootstrap operation is required. Sequential operations can mean a sequence of multiplication operations that before being interrupted with an add operation. The largest number of multiplication operations on a path can be the number between an input and an output, or bootstrap operation. Additionally, current machine learning techniques that use homomorphic encryption are limited to only simple and non-standard types of machine learning models. These non-standard machine learning models are not proven efficient and accurate when dealing with more practical and advanced datasets.

Embodiments of the present disclosure may overcome the above and other problems by providing dropout methodologies that include single neuron per batch dropout, neuron group per sample dropout, and neuron group per batch dropout techniques. These methodologies can reduce the multiplication depth of a circuit that operates on fully homomorphic encryption by omitting some plaintext masks. The dropout methodologies provide multiple packing and dropout options that can be selected based on the performance and accuracy of the model.

More specifically, embodiments of the disclosure provide techniques for training a neural network using homomorphically encrypted input that removes or reduces the masking requirement based, at least partially, on the packing or dropout techniques used to train the neural network. For instance, a training sample can be packed into a ciphertext that is passed through a neural network. The neurons are also packed together in a ciphertext based on the packing of the training sample. When dropout selects a neuron to be ignored, instead of just the neuron being ignored, which would require masking, the entire ciphertext block is ignored.

By way of example, but not by limitation, a neural network is trained using homomorphically encrypted input. A training dataset is homomorphically encrypted with a predetermined packing formation. The packing formation may be that each sample is in its own ciphertext, or multiple samples are packed into ciphertext to form a batch. It should be noted that other packing formations can be implemented and applied to the training dataset. Based on the packing formation, a dropout technique is selected, and the neurons in the neural network are packed into neuron groupings that correspond to that dropout technique. The neuron groupings can be based in such a way as to avoid the need to mask data when a neuron is dropped during training. Once established, the neural network can input the first packing formation from the training data set and, in an iterative manner, begin to train the neural network with the next packing formation from the training dataset acting as an initial input to the neural network for the following iteration. The process continues until a stopping metric is achieved. The stopping metric can be, for example, when a neural network achieves a predetermined accuracy during validation or when accuracy is no longer improved after a training cycle.

In some embodiments, the neurons of the neural network are packed into neuron groupings. The neuron groupings can group neurons on a per-layer basis such that a neuron group will only contain neurons within the same layer. For example, and for illustration only, a layer includes four neurons with the first and second neuron in a neuron grouping and the third and fourth neuron in another neuron grouping. Neurons in previous or subsequent layers cannot be within either grouping. In some embodiments, the neuron groupings are based on the packing formation used by the homomorphic encryption used to pack the sample in a training dataset. For example, a training sample can be converted into a ciphertext with four features. Based on that packing, the neuron grouping can consist of four neurons.

In some embodiments, the packing formation is based on the dropout technique being implemented on the neural network. For example, the neural network may utilize a dropout technique that drops neuron groupings instead of a single neuron. When a neuron is selected for dropping, the neuron grouping the neuron is within will be entirely dropped. By dropping an entire neuron group, masking does not need to occur, thereby reducing the multiplication depth of a circuit that operates the fully homomorphic encrypted input.

In some embodiments, the packing formation of the input (e.g., training dataset) packs multiple samples within a ciphertext. The ciphertext can include at least two samples within the ciphertext that can improve the optimization of the neural network. The number of samples per ciphertext can be based on the noise generated by the neural network when inputted. For example, ciphertexts may have a threshold of samples, at which point the noise generated by the neural network becomes too great.

FIG. 1 is a block diagram illustrating a neural network training environment 100 for optimized training of neural networks using homomorphically encrypted elements and dropout algorithms for regularization. The neural network training environment 100 includes a training dataset 110, a homomorphic encryption module 120, a packing formation 130, and a neural network 140. The neural network includes neurons, synapses, and neuron groupings 148-1, 148-2, 148-3, 148-4, 148-5, 148-6, 148-7, and 148-8. For purposes of the present description, it will be assumed that the illustrative embodiments are being implemented as part of a machine learning training methodology. However, this is only one possible implementation and is not intended to be limiting on the present disclosure. Other implementations in which machine learning techniques are utilized may also be used without departing from the spirit and scope of the present disclosure.

The training dataset 110 is a set of data the neural network training environment 100 used as training data for the neural network 140. The training dataset 110 includes a collection of samples, with each sample containing one or more features and a label. In some embodiments, the training dataset 110 is divided into a training set, a validation set, and a test set. The validation set can be a subset of the training dataset 110 for use in validating a pseudo labeled dataset produced by the neural network 140. The test set can also be a subset of the training dataset 110 used to test the neural network 140 after training and validation.

The training dataset 110 may, for example, be used for image classification, in which case the training data may comprise images with known classifications. The training dataset 110 may also include data that is considered sensitive, personal, and/or confidential. As such, there is a need to encrypt such data and to train the neural network 140 to process that information in an encrypted form. Thus, upon deployment, the neural network 140 can accurately operate on information in an encrypted state.

The homomorphic encryption module 120 is a component of the neural network training environment 100 configured to homomorphically encrypt the training dataset 110. The homomorphic encryption module 120 provides a cryptosystem that encrypts the training dataset 110 such that computation can be performed on the encrypted data without decryption, thereby enabling secure outsourcing computation. In some embodiments, the homomorphic encryption module 120 encrypts multiple samples into a single packed ciphertext known as a batch. Single instruction multiple data (SIMD) techniques can be used to perform operations on those values in parallel. In some embodiments, each sample is packed into a ciphertext. A packing formation 130 is generated that are the ciphertexts generated by the homomorphic encryption module 120 when encrypting the training dataset 110. The packing formation 130 can describe how the data is packed, whether it be in a batch form, one ciphertext per sample form, or some other packing formation.

Additionally, the homomorphic encryption module 120 can apply multiple types of encryption schemes that can perform different classes of computation over the encrypted data. These schemes include, but are not limited to, partially homomorphic encryption, somewhat homomorphic encryption, leveled fully homomorphic encryption, and fully homomorphic encryption.

The neural network 140 is a component of the neural network training environment 100 trained based on the training dataset 110 inputted. The neural network 140 can include multiple neurons (nodes) arranged in various layers. The neurons form adjacent layers, including connections or edges between them. Each connection between neurons can have a weight associated with them that can assist the neural network 140 in evaluating the input received. The neural network 140 also includes neuron grouping 148-1, 148-2, 148-3, 148-4, 148-5, 148-6, 148-7, 148-N (collectively "neuron groupings 148") where N is a variable integer representing any number of possible neuron groupings 148.

The input layer 142 is a layer of the neural network 140 configured to provide information to the neural network 140. The input layer 142 can receive input, such as encrypted samples from the dataset 110 packing in a packing formation 130, to feed into the neural network 140. In some embodiments, the input layer 142 can input additional information into the neural network 140. For example, the input layer 142 can input a packing formation 130 in the form of a batch with multiple samples in a single ciphertext where each input neuron inputs features from the samples.

The hidden layers 144 are layers of the neural network 142 configured to perform computations and transfer information from one layer to another layer. The hidden layers 144 can comprise a collection of hidden neurons to form the hidden layers 144. While only shown as three layers with each layer having four neurons in FIG. 1, it will be appreciated that the neural network 140 can include multiple hidden layers with multiple neurons in each layer depending on the configuration of the neural network 140.

Overfitting and underfitting the inputted data can be addressed and regulated through dropout techniques. Low bias can result in the neural network 140 overfitting the data, and high bias can result in the neural network 140 underfitting the data. Overfitting occurs when the neural network 140 learns its training data well but cannot generalize beyond the training data. Underfitting occurs when the neural network 140 is not able to generate accurate predictions on the training data or on validation data.

Dropout, also commonly referred to as dilution or dropconnect, is a regularization technique for reducing overfitting in neural networks. The dropout technique includes omitting neurons (both hidden and visible) during the training process of the neural network 140. Additionally, the weights associated with the synapses can be lowered, or "thinned", separately or in conjunction with omitting neurons.

The process by which the neuron is dropped, or driven to zero, can be achieved by setting the weights to zero, ignoring the neuron, or by any other mean that negates the calculation of the neuron and that does not impact the end result or create a new and unique case. In some embodiments, when a neuron is selected for dropout, the entire neuron grouping 148 in which the neuron belongs will be dropped.

Neuron groupings 148 are groupings of neurons within a layer that are packed into a single ciphertext. As shown in FIG. 1, each layer includes four neurons, with the neuron groupings 148 having two neurons per grouping. It should be noted, however, that other configurations may apply. For instance, there may be any number of neurons in a layer with various combinations of neuron groupings with that layer. A layer may contain a neuron grouping of only one neuron and another neuron grouping of several neurons.

The configuration of the neuron groupings can be configured to optimize the performance of the neural network 140. If, during testing, a neuron grouping of a certain size performs in such a way as to make the neural network achieve higher performance metrics, then that grouping can be selected for the entire neural network 140. In some embodiments, the neuron groupings 148 are selected based on the packing formation 130 of the data being inputted. For instance, if the packing formation includes a sample with four features, then the neuron groupings 148 can be packed with four neurons as each feature is inputted into a neuron during testing. The neuron groupings 148 can also be packed and dropped so as to avoid the need to mask data, thereby reducing the multiplication depth of the neural network 140. The output layer 146 is a layer of the neural network 140 configured to transfer information from the neural network 140 to an outside destination.

During the training stage, the neural network 140 learns optimal weights for each neuron. An optimal configuration can then be applied to test data. Exemplary applications of such a neural network 140 include image classification, object recognition, speech recognition, and/or data that may be considered sensitive, private, privileged, personal, and/or confidential.

It is noted that FIG. 1 is intended to depict the representative major components of an exemplary neural network training environment 100. In some embodiments, individual components may have greater or less complexity than as represented in FIG. 1, components other than or in addition to those shown in FIG. 1 may be present, and the number, type, and configuration of such components may vary.

Figure 2:
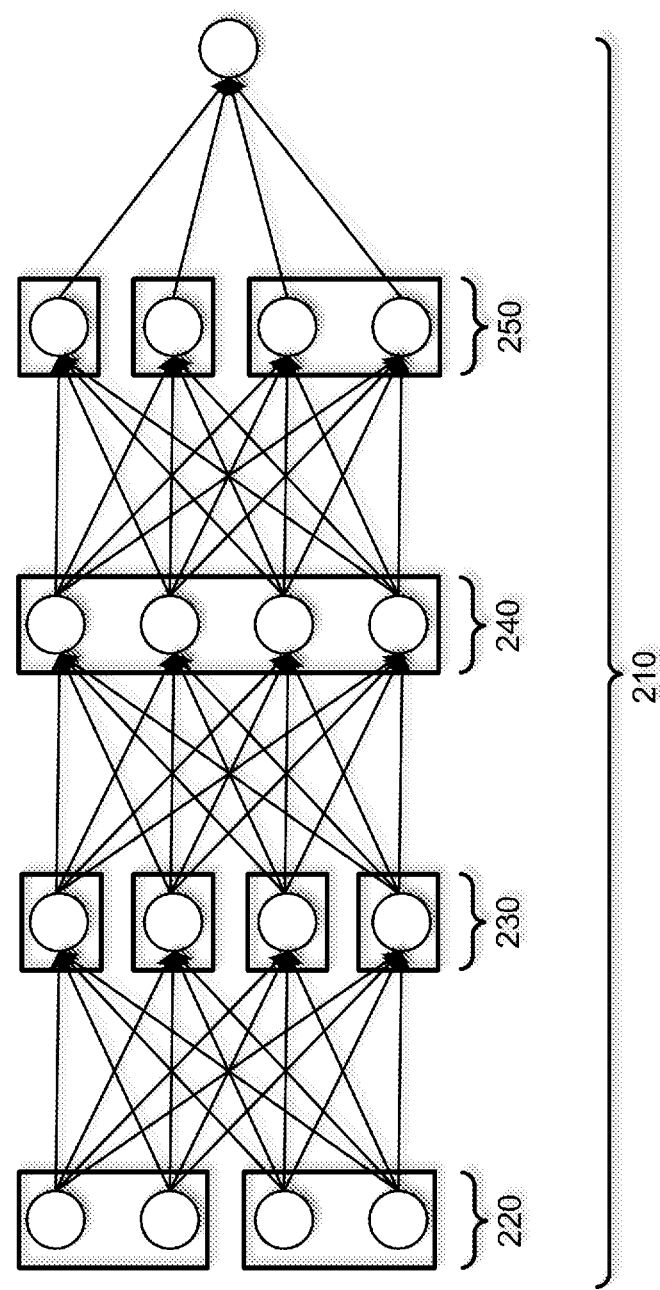
FIG. 2 is a block diagram illustrating different neuron groupings for dropout on a neural network and used by one or more embodiments of the present disclosure.

FIG. 2 is a block diagram illustrating a neural network configuration 200 with a neural network having varying neuron groupings in each layer, in accordance with embodiments of the present disclosure. The neural network 200 includes layers 220, 230, 240, and 250.

Layer 220 includes four neurons with two neuron groupings. Each neuron grouping has two neurons residing in layer 220. Layer 230 also includes four neurons. However, the neuron is grouped individually. The neuron groups in layer 230 can be viewed as single neuron groups or as a layer without any neuron groupings. Layer 240 includes a group containing all of the neurons within that layer, while layer 250 includes varying neuron group sizes within that single layer 250. Layer 250 includes a neuron grouping of two neurons, and two other neuron groupings with a single neuron in each.

The neuron grouping configurations in FIG. 2 are only for illustrative purposes and are used solely to demonstrate the various ways the neural network 200 can be configured with varying neuron groupings. In some embodiments, the neural network 200 includes neuron groupings of equivalent sizes, while in some other embodiments, the neural network 200 includes varying-sized neuron groupings. It should be noted that the neuron grouping configuration can be based on the performance and accuracy of the neural network, and multiple neuron grouping configurations can be tested to achieve the most optimal approach in terms of performance and dropout.

Figure 3A:
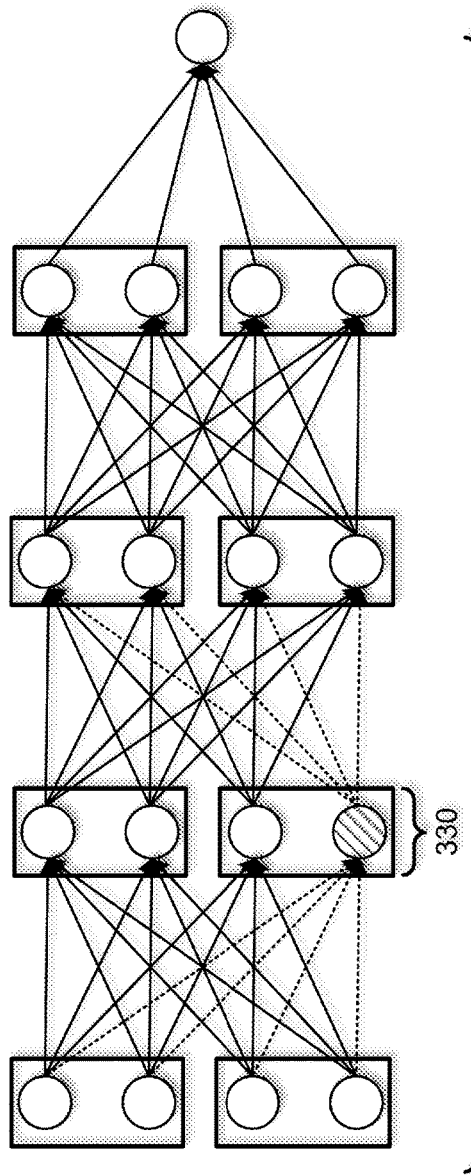
FIGS. 3A and 3B are block diagrams illustrating different dropout techniques when inputting batch input into a neural network and used by one or more embodiments of the present disclosure.
Figure 3A:
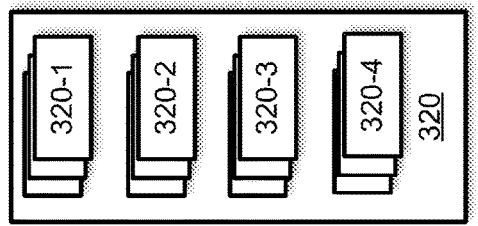
Figure 3B:
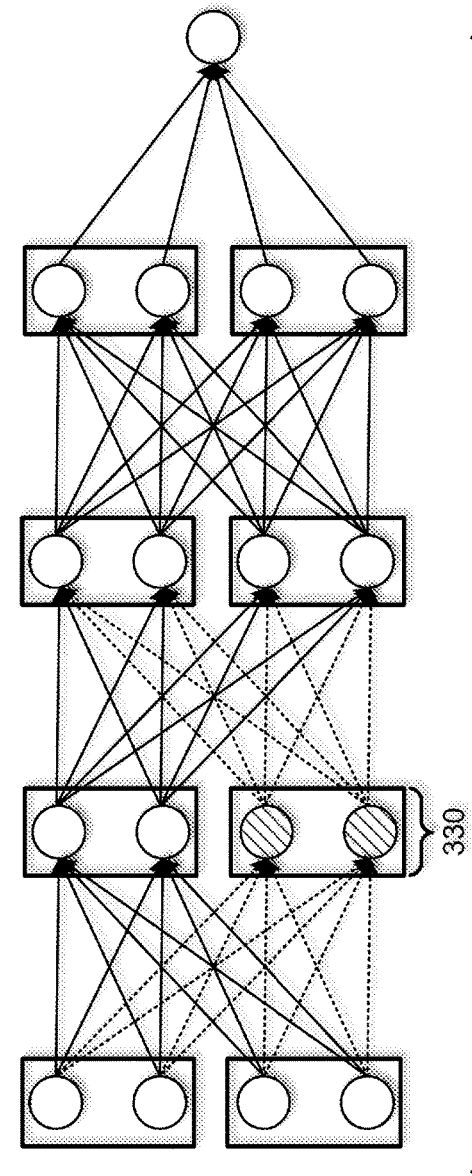
Figure 3B:
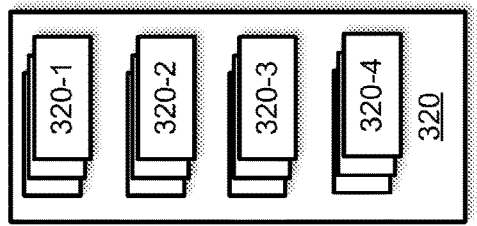

FIGS. 3A and 3B are block diagrams illustrating neural network 310 with a batch packing formation as input utilizing dropout techniques. Starting with FIG. 3A, the neural network 310 inputs an input 320 in a homomorphically encrypted batch packing formation. The batch packing formation includes batches 320-1, 320-2, 320-3, and 320-4 (collectively "batches 320"). Batches 320 can include features from multiple samples within the same ciphertext packing formation. For instance, batch 320-1 can include the same type of feature from three different samples. The batches 320 can be inputted into the neural network 310 simultaneously or in succession to increase performance and utility.

Once the batch packing formation 320 is inputted into the neural network and training occurs, a neuron is selected for the drop, as illustrated by the neuron with a diagonal lined pattern. Additionally, the synapses connected to the neuron are effectively turned off, as indicated by the dashed lines connecting to and from the selected neuron. As such, in some embodiments, a homomorphically encrypted batch packing formation 320 can be inputted into a neural network 310 where one neuron is selected for dropout.

FIG. 3B again shows the neural network 310 inputs an input 320 in a homomorphically encrypted batch packing formation. The batch packing formation includes batches 320-1, 320-2, 320-3, and 320-4 (collectively "batches 320"). The batches 320 can include features from multiple samples within the same ciphertext packing formation. For instance, batch 320-1 can include the same type of feature from three different samples. The batches 320 can be inputted into the neural network 310 simultaneously or in succession to increase performance and utility.

Once the batch packing formation 320 is inputted into the neural network and training occurs, a neuron is selected for the drop, as illustrated by the neuron with a diagonal lined pattern. In this instance, however, the neuron group 330, in which the dropout neuron resides, is also dropped out. Thus, both neurons in the neuron group 330 are dropped for that training iteration. Additionally, the synapses connected to both of the neurons are effectively turned off, as indicated by the dashed lines connecting to and from the selected neuron. As such, in some embodiments, a homomorphically encrypted batch packing formation 320 can be inputted into a neural network 310 where one neuron is selected for dropout, causing its neuron grouping 330 to be dropped as well for that training iteration.

Thus, the illustrative embodiments provide mechanisms for optimizing the training of neural networks with homomorphically encrypted data by utilizing dropout techniques that can reduce the multiplicative depth of the neural network. Additionally, the mechanisms of the illustrative embodiments may operate in conjunction with other neural network training techniques and/or other computing systems to perform actions that utilize machine learning models and techniques that optimize the performance of neural networks, and, more specifically, to optimize neural networks that input homomorphic encryption data.

Figure 4:
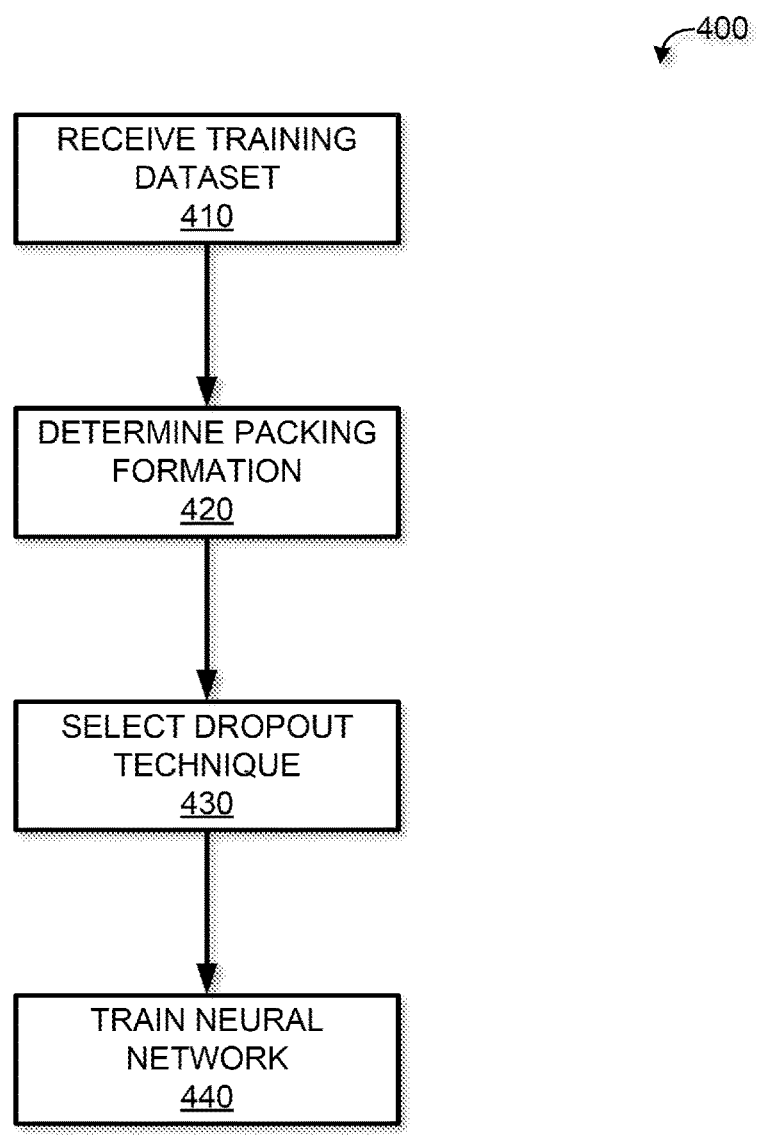
FIG. 4 is a flow diagram illustrating a process of training a neural network performed in accordance with embodiments of the present disclosure.

FIG. 4 is a flow diagram illustrating a process 500 of training a neural network using homomorphic encryption elements and dropout algorithms for regularization, in accordance with embodiments of the present disclosure. As shown in FIG. 4, the process 400 beings by receiving, via an input to the neural network 140, a training dataset 110 that is encrypted using homomorphic encryption 120. This is illustrated at step 410. The training dataset can include a collection of samples, with each sample containing one or more features and a label. In some embodiments, the training dataset 110 is divided into a training set, a validation set, and a test set. The validation set can be a subset of the training dataset 110 for use in validating a pseudo labeled dataset produced by the neural network 140.

The homomorphic encryption packing formation 130 of the training dataset 110 is determined. This is illustrated at step 420. The packing formation 130 can describe how the data is packed into a ciphertext, whether it be in a batch form, one ciphertext per sample form, or some other packing formation. Once the packing formation is determined, a dropout technique is selected based on the type of packing formation 130 used to homomorphically encrypt the training dataset 110. This is illustrated at step 430. The dropout technique can configure the neurons within the neural network 140 into neuron groupings 148 such that when a neuron is dropped, a mask is not required when dropping the neuron for that training iteration. For instance, the packing formation 130 packs samples and features in such a way as to require the neuron groupings 148 to have four neurons per grouping. When four neurons per grouping are used, in this particular instance, then a mask need not be applied when the entire neuron group is dropped. The configuration of the neuron groupings can also be configured to optimize the performance of the neural network 140.

In some embodiments, the packing formation is selected based on the dropout technique and neuron grouping 148 of the neural network 140. For example, an optimized neuron grouping 148 for a neural network 140 is two neurons per neuron grouping 148. Thus, the packing formation 130 can pack the samples in such a way as to accommodate that dropout technique and neuron grouping 148 and avoid needing to use a mask during dropout.

The neural network is trained with the homomorphically encrypted dataset 110. This is illustrated at step 440. Once the packing formation 130 is determined and the dropout technique is set with neuron groupings configured, the neural network 140 can start with the first packing formation 130 from the training dataset 110, and input that formation 130 into the neural network 140. In an iterative or recursive manner, training continues with the selected dropout technique applied to account for regularization by inputting the next packing formation 130 until a stopping metric is produced by the neural network. The stopping metric can interrupt training when a neural network's performance on a validation set begins to decline or when the neural network 140 achieves a predetermined level of accuracy.

Figure 5:
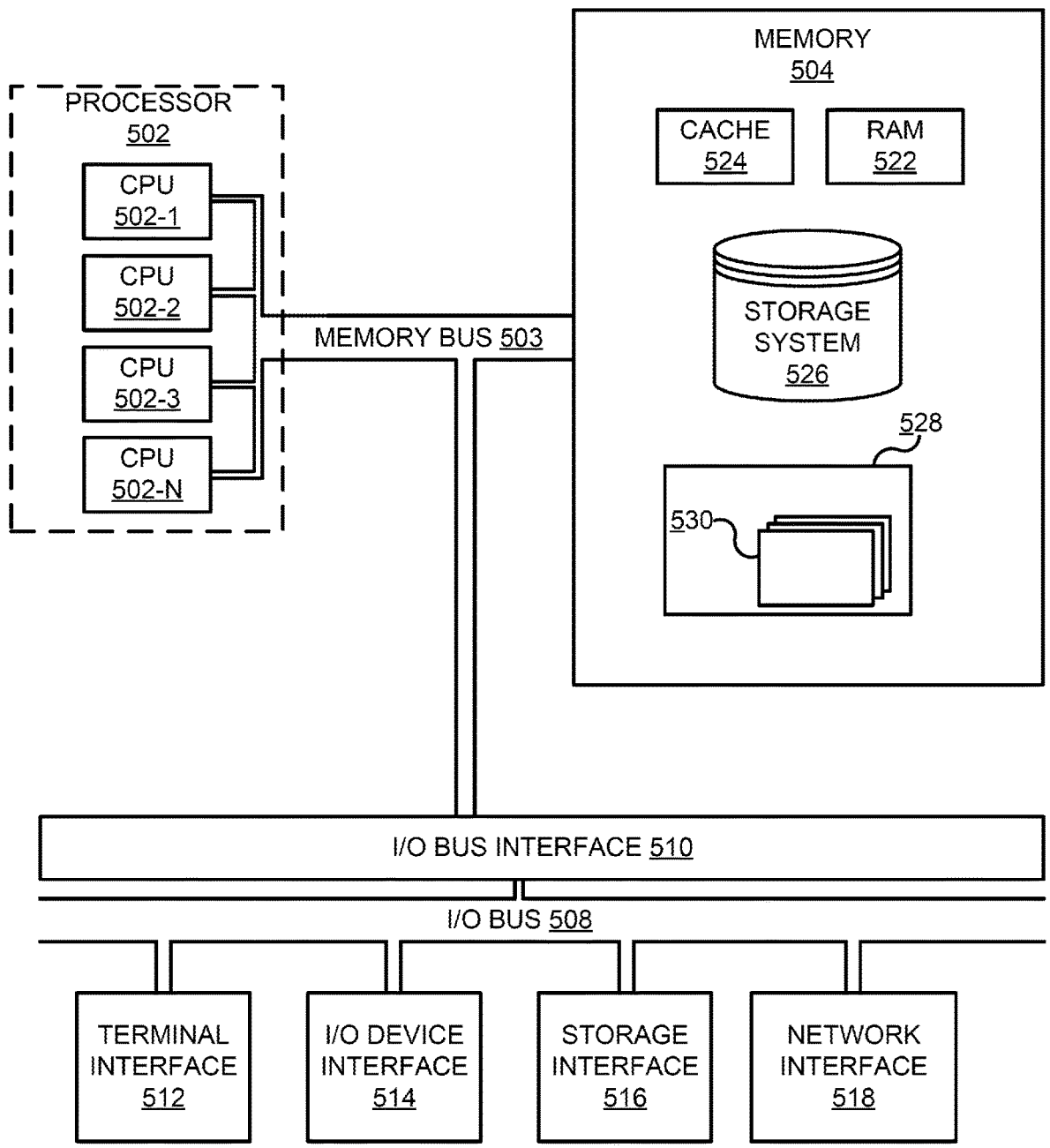
FIG. 5 is a high-level block diagram illustrating an example computer system that may be used in implementing one or more of the methods, tools, modules, and any related functions described herein in which the disclosure may be implemented.

Referring now to FIG. 5, shown is a high-level block diagram of an example computer system 500 (e.g., the neural network training environment 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502 (e.g., graphics processing unit, physics processing unit, application-specific integrated circuit, field programmable gate array). In some embodiments, the computer system 500 may contain multiple processors typical of a relatively large system; however, in other embodiments, the computer system 500 may alternatively be a single CPU system. Each processor 502 may execute instructions stored in the memory 504 and may include one or more levels of onboard cache.

The memory 504 may include computer system readable media in the form of volatile memory, such as random-access memory (RAM) 522 (e.g., processing in memory) or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments, some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the neural network training environment 100), may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected neurons.

Figure 6:
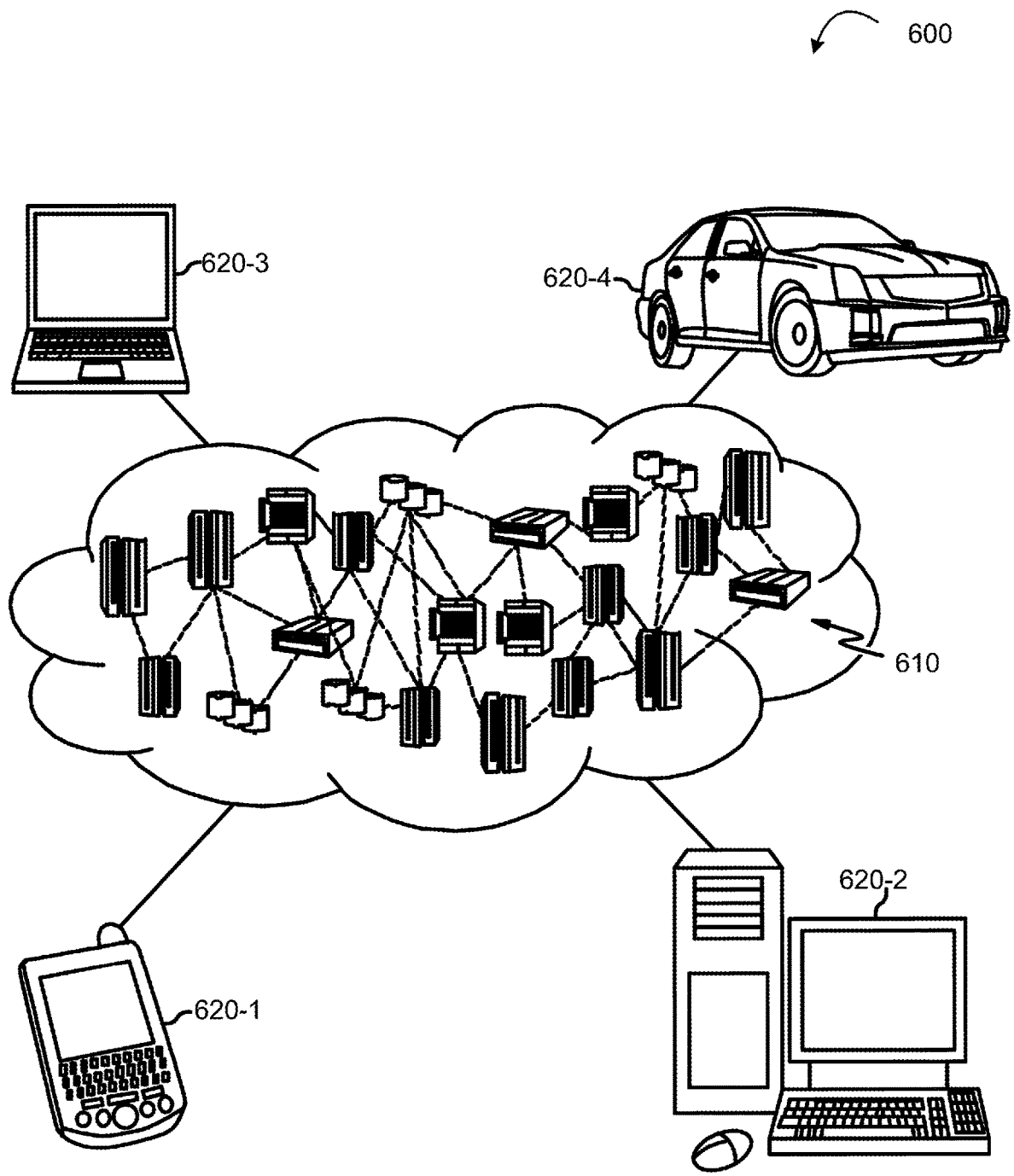
FIG. 6 depicts a cloud computing environment in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (P.D.A.) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
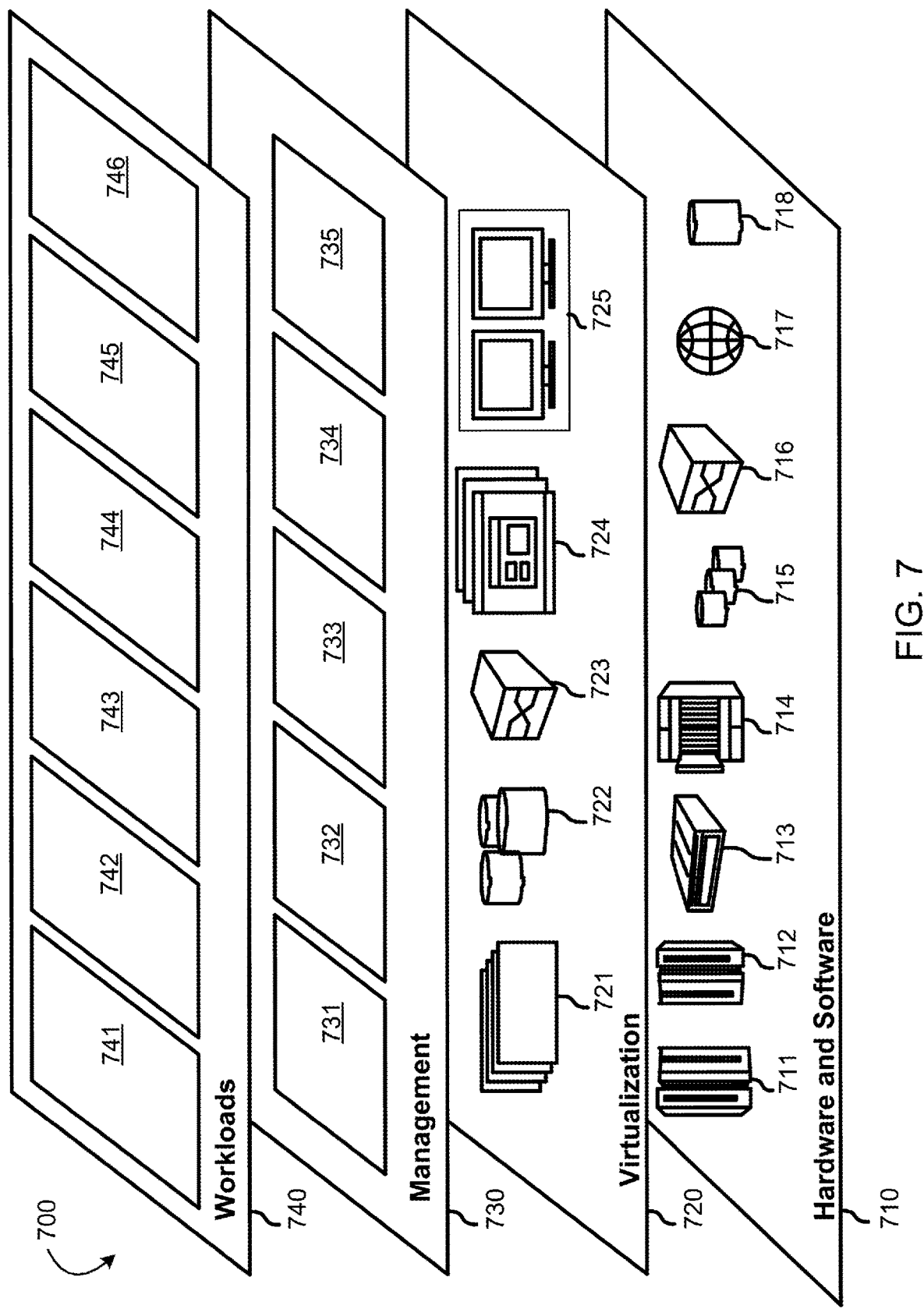
FIG. 7 depicts abstraction model layers in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include mapping and navigation 741; software development and lifecycle management 742 (e.g., the neural network training environment 100); virtual classroom education delivery 743; data analytics processing 744; transaction processing 745; and an analysis system 746.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a neural network, the method comprising:
   receiving, via an input to the neural network, a training dataset containing samples that are encrypted using homomorphic encryption;
   determining a packing formation used by the homomorphic encryption used to pack the samples in the training dataset;
   selecting a dropout technique during training of the neural network based on the packing formation; and
   starting with a first packing formation from the training dataset, inputting the first packing formation in an iterative or recursive manner into the neural network using the selected dropout technique, with a next packing formation from the training dataset acting as an initial input that is applied to the neural network for a next iteration, until a stopping metric is produced by the neural network.

2. The method of claim 1, wherein the packing formation is based on the dropout technique being implemented on the neural network.

3. The method of claim 1, wherein neurons of the neural network are packed into neuron groupings.

4. The method of claim 3, wherein the dropout technique drops a neuron grouping that includes a neuron selected for dropping.

5. The method of claim 3, wherein the neuron groupings are packed in a similar formation as the packing formation of the training dataset.

6. The method of claim 3, wherein the neuron groupings are packed as ciphertexts.

7. The method of claim 1, wherein the packing formation is in a form of a batch that includes at least two training samples from the training dataset in one ciphertext.

8. The method of claim 7, wherein the dropout technique drops a neuron grouping that includes a neuron selected for dropping.

9. The method of claim 1, wherein the packing formation are homomorphic encryption ciphertexts.

10. A computer program product comprising a computer readable storage medium having computer readable instructions stored therein, wherein the computer readable instructions, when executed on a computing device, causes the computing device to:
    receive, via an input to a neural network, a training dataset containing samples that are encrypted using homomorphic encryption;
    determine a packing formation used by the homomorphic encryption used to pack the samples in the training dataset;
    select a dropout technique during training of the neural network based on the packing formation; and
    starting with a first packing formation from the training dataset, input the first packing formation in an iterative or recursive manner into the neural network using the selected dropout technique, with a next packing formation from the training dataset acting as an initial input that is applied to the neural network for a next iteration, until a stopping metric is produced by the neural network.

11. The computer program product of claim 10, wherein the packing formation is based on the dropout technique being implemented on the neural network.

12. The computer program product of claim 10, wherein neurons of the neural network are packed into neuron groupings.

13. The computer program product of claim 12, wherein the dropout technique drops a neuron grouping that includes a neuron selected for dropping.

14. The computer program product of claim 12, wherein the neuron groupings are packed in a similar formation as the packing formation of the training dataset.

15. The computer program product of claim 10, wherein the packing formation is in a form of a batch that includes at least two training samples from the training dataset in one ciphertext.

16. The computer program product of claim 15, wherein the dropout technique drops a neuron grouping that includes a neuron selected for dropping.

* * * * *